United States Patent
Choi et al.

(10) Patent No.: US 11,652,960 B2
(45) Date of Patent: May 16, 2023

(54) PRESENTING A FACIAL EXPRESSION IN A VIRTUAL MEETING

(71) Applicant: QUALCOMM incorporated, San Diego, CA (US)

(72) Inventors: Jae-Won Choi, Seoul (KR); Sungrack Yun, Seongnam (KR); Janghoon Cho, Seoul (KR); Hanul Kim, Uijeongbu-si (KR); Hyoungwoo Park, Seoul (KR); Seunghan Yang, Incheon (KR); Kyu Woong Hwang, Daejeon (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/320,627

(22) Filed: May 14, 2021

(65) Prior Publication Data

US 2022/0368856 A1    Nov. 17, 2022

(51) Int. Cl.
*H04N 7/15*    (2006.01)
*G06V 40/16*    (2022.01)

(52) U.S. Cl.
CPC ........... *H04N 7/157* (2013.01); *G06V 40/166* (2022.01); *G06V 40/176* (2022.01)

(58) Field of Classification Search
CPC combination set(s) only.
See application file for complete search history.

(56) References Cited

U.S. PATENT DOCUMENTS

| | | |
|---|---|---|
| 2007/0260984 A1 | 11/2007 | Marks et al. |
| 2008/0068397 A1 | 3/2008 | Carey et al. |
| 2010/0153868 A1 | 6/2010 | Allen et al. |
| 2010/0211397 A1 | 8/2010 | Park et al. |
| 2013/0293584 A1* | 11/2013 | Anderson ............... G01C 21/20 345/633 |
| 2015/0379752 A1* | 12/2015 | Li ........................... G06T 13/80 715/752 |
| 2017/0083086 A1* | 3/2017 | Mazur ................... A63F 13/213 |
| 2017/0178287 A1 | 6/2017 | Anderson |

(Continued)

OTHER PUBLICATIONS

Samadiani N., et al., "A Review on Automatic Facial Expression Recognition Systems Assisted by Multimodal Sensor Data", Sensors, vol. 19, 1863, 2019, pp. 1-27.

(Continued)

*Primary Examiner* — Phung-Hoang J Nguyen
(74) *Attorney, Agent, or Firm* — The Marbury Law Group, PLLC

(57) ABSTRACT

Embodiment systems and methods for presenting a facial expression in a virtual meeting may include detecting a user facial expression of a user based on information received from a sensor of the computing device, determining whether the detected user facial expression is approved for presentation on an avatar in a virtual meeting, generating an avatar exhibiting a facial expression consistent with the detected user facial expression in response to determining that the detected user facial expression is approved for presentation on an avatar in the virtual meeting, generating an avatar exhibiting a facial expression that is approved for presentation in response to determining that the detected user facial expression is not approved for presentation on an avatar in the virtual meeting, and presenting the generated avatar in the virtual meeting.

31 Claims, 7 Drawing Sheets

(56) References Cited

U.S. PATENT DOCUMENTS

| | | |
|---|---|---|
| 2018/0144761 A1 | 5/2018 | Amini et al. |
| 2018/0331842 A1 | 11/2018 | Faulkner et al. |
| 2018/0335930 A1* | 11/2018 | Scapel ................. G06V 40/176 |
| 2019/0124128 A1 | 4/2019 | Bader-Natal et al. |
| 2019/0156112 A1 | 5/2019 | Shaburov et al. |
| 2019/0377586 A1 | 12/2019 | Faulkner et al. |

OTHER PUBLICATIONS

International Search Report and Written Opinion—PCT/US2022/017431—ISA/EPO—dated Jun. 15, 2022. 18 pages.

* cited by examiner

PRESENTING A FACIAL EXPRESSION IN A VIRTUAL MEETING

BACKGROUND

Communication networks have enabled the development of applications and services for online meetings and gatherings. Some systems provide a virtual environment that presents visual representations of attendees known as "avatars" that may range from simplistic or cartoon-like images to photorealistic images. Some of these systems include a virtual reality (VR) device, such as a VR headset or other VR equipment, that records a user's movement and voice. Such systems may generate a facial expression on a user's avatar based on the user's movements and utterances.

However, the expressions, words, and actions of a virtual meeting attendee may not be related to the meeting. A user may react to any number of things that occur in the user's real-world environment, such as interruptions from children, pets, or other people, outside noise, phone calls, and other interruptions. Also, the system may detect and show expressions that the user does not want to display to others in the online meeting, such as anger, annoyance, frustration, and the like. Further, the system may inaccurately capture and display an expression, resulting in a mismatch between what the user intends to convey and the displayed expression that may be awkward, confusing, or insulting. Current systems provide no mechanism for a user to review or approve a facial expression for display on a user's avatar.

SUMMARY

Various aspects include methods and computing devices configured to perform the methods for presenting a facial expression in a virtual meeting. Various aspects may include detecting a user facial expression of a user based on information received from a sensor of the computing device, determining whether the detected user facial expression is approved for presentation on an avatar in a virtual meeting, generating an avatar exhibiting a facial expression consistent with the detected user facial expression in response to determining that the detected user facial expression is approved for presentation on an avatar in the virtual meeting, generating an avatar exhibiting a facial expression that is approved for presentation on an avatar in a virtual meeting but differing from the detected user facial expression in response to determining that the detected user facial expression is not approved for presentation on an avatar in the virtual meeting, and presenting the generated avatar in the virtual meeting. Some aspects may further include continuing to present a currently-presented avatar in response to determining that the detected user facial expression is not approved for presentation on an avatar in the virtual meeting. Some aspects may further include generating an avatar exhibiting a facial expression that is approved for presentation on an avatar in a virtual meeting but differing from the detected user facial expression in response to determining that the detected user facial expression is not approved for presentation on an avatar in the virtual meeting.

In some aspects, generating an avatar exhibiting a facial expression that is approved for presentation on an avatar in a virtual meeting but differing from the detected user facial expression in response to determining that the detected user facial expression is not approved for presentation on an avatar in the virtual meeting may include generating an avatar exhibiting a recent expression that was approved for presentation. In some aspects, detecting a user facial expression of a user based on information received from a sensor of the computing device may include detecting the user facial expression based on information received from an image sensor of the computing device.

In some aspects, determining whether the detected user facial expression is approved for presentation on an avatar in a virtual meeting may include determining whether the user facial expression was previously approved for presentation on an avatar in the virtual meeting, and presenting the generated avatar in the virtual meeting may include presenting in the virtual meeting the generated avatar exhibiting the facial expression that was previously approved in response to determining that the user facial expression was previously approved for presentation on the avatar in the virtual meeting. In some aspects, determining whether the detected user facial expression is approved for presentation on an avatar in a virtual meeting may include rendering an avatar exhibiting a facial expression consistent with the detected user facial expression on a user interface configured to receive an approval or rejection by the user, and determining that the detected user facial expression is approved in response to receiving an input on a user interface of the computing device indicating that the user facial expression is approved for presentation in the virtual meeting.

Some aspects may include, in the absence of a responsive input to the user interface within a threshold period of time, determining that the detected user facial expression is approved for presentation on an avatar in the virtual meeting. Some aspects may include storing in a memory an indication that an avatar exhibiting a facial expression consistent with the detected the user facial expression is approved or is not approved for presentation in a virtual meeting in response to receiving an input on a user interface of the computing device indicating that the detected user facial expression is approved or is not approved for presentation on an avatar in the virtual meeting.

In some aspects, determining whether the detected user facial expression is approved for presentation on an avatar in a virtual meeting may include determining that the detected user facial expression is stored in a preset list as approved or as not approved, rendering an avatar exhibiting a facial expression consistent with the detected user facial expression on a user interface configured to receive an approval or rejection by the user, and updating the preset list in response to receiving an input that is different from the preset list indicating that the user facial expression is approved or is not approved for presentation on an avatar in the virtual meeting.

In some aspects, determining whether the detected user facial expression is approved for presentation on an avatar in a virtual meeting may include determining whether the detected user facial expression is approved for presentation on the avatar in the virtual meeting based on an expressive sound of the user. In some aspects, presenting the generated avatar in the virtual meeting may include rendering a representation of an expressive sound of the user in the virtual meeting in conjunction with presenting the generated avatar in the virtual meeting.

Further aspects may include a computing device including a memory and a processor coupled to the memory and configured with processor-executable instructions to perform operations of any of the methods described above. Further aspects may include processor-readable storage media upon which are stored processor executable instructions configured to cause a controller of a computing device to perform operations of any of the methods described above. Further aspects may include a computing device including means for performing functions of any of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of some embodiments.

DETAILED DESCRIPTION

Figure 1:
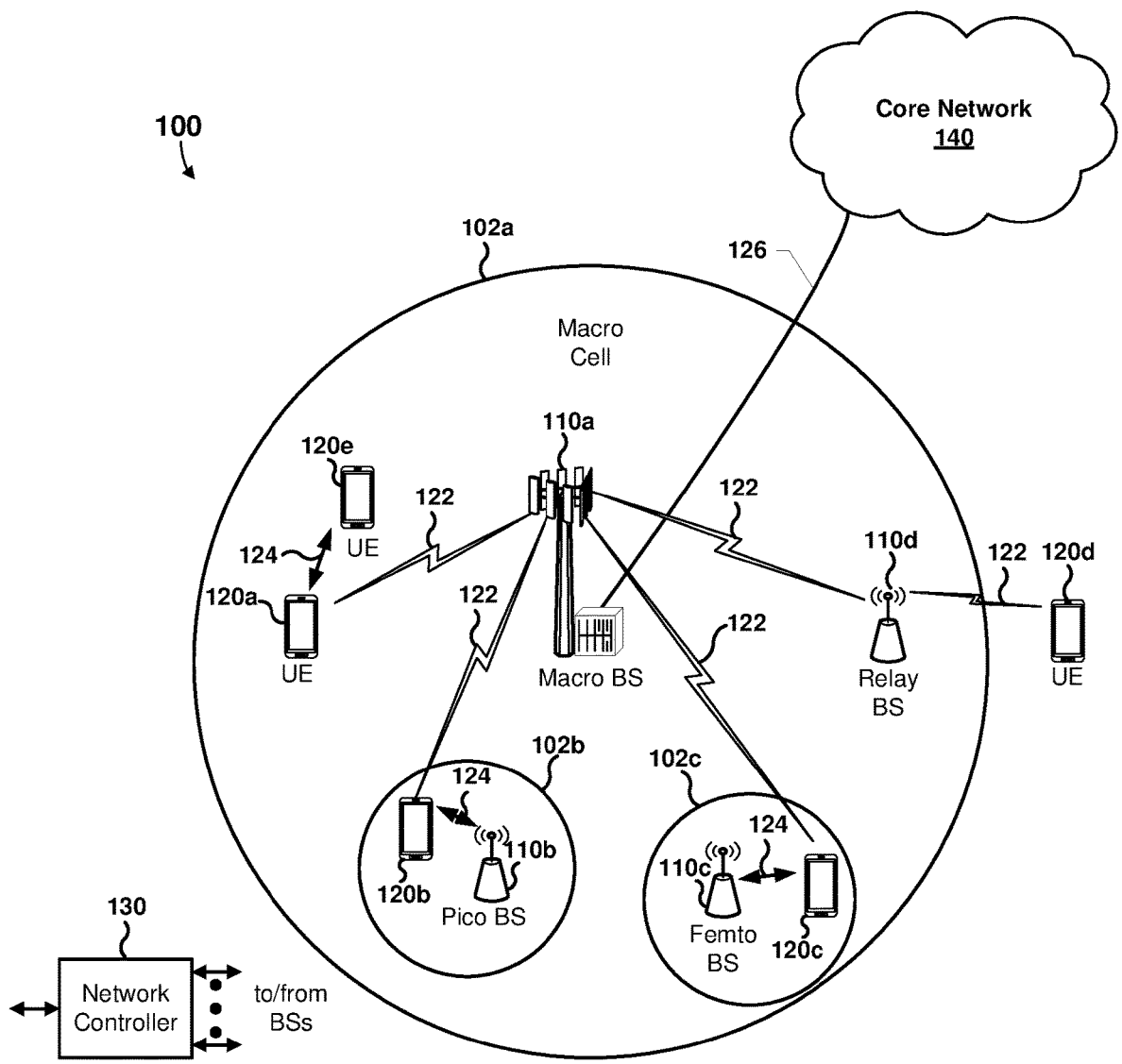
FIG. 1 is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

Various embodiments provide methods for presenting facial expressions on avatars of participants in a virtual meeting that participants consider to be appropriate, which may be implementation in devices such as mobile computing devices. Various embodiments enable the computing device to learn user approved and disapproved facial expressions for presentation on a user's avatar in a virtual meeting. Various embodiments obviate the need for additional bulky and expensive peripheral equipment, such as virtual reality headsets and similar devices. Various embodiments improve the operation of computing devices and virtual meeting systems by enabling the automatic filtering of facial expressions rendered on participant avatars to improve the conduct of virtual meetings.

The terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The term "computing device" is used herein to refer to any one or all of cellular telephones, smartphones, portable computing devices, personal or mobile multi-media players, laptop computers, tablet computers, smartbooks, ultrabooks, palmtop computers, electronic mail receivers, multimedia Internet-enabled cellular telephones, router devices, medical devices and equipment, biometric sensors/devices, wearable devices including smart watches, smart clothing, smart glasses, smart wrist bands, smart jewelry (e.g., smart rings, smart bracelets, etc.), entertainment devices (e.g., gaming controllers, music and video players, satellite radios, etc.), Internet of Things (IoT) devices including smart meters/sensors, industrial manufacturing equipment, large and small machinery and appliances for home or enterprise use, computing devices within autonomous and semiautonomous vehicles, mobile devices affixed to or incorporated into various mobile platforms, global positioning system devices, and similar electronic devices that include a memory and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement Global System for Mobile Communications (GSM) Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

Some online meeting and gathering systems provide a virtual environment that presents visual "avatars" of attendees instead of a simple name label or live images. Such avatars may range from simplistic or cartoon-like images to photorealistic images. Some systems supporting virtual meetings include a VR device, that records a user's movement and voice, and then generate a facial expression on a user's avatar based on the user's movements and utterances.

As noted above, the expressions, words, and actions of a virtual meeting attendee may be unrelated to the meeting under a variety of circumstances. For example, a user may react to any number of things that occur in the user's real-world environment, such as interruptions from children, pets, or other people, outside noise, phone calls, and other interruptions. Also, sometimes participants in virtual meetings may react negatively or unprofessionally to what is said or presented in the meet, and it would be best for those participants to avoid having their avatar exhibit inappropriate expressions that the user does not want to display to others in the online meeting. For example, meeting participants may not want momentary expressions of anger, annoyance, frustration, and the like to be presented on their meeting avatars. Further, virtual meeting software sometimes may misinterpret or inaccurately detect a participant's expression, which could result in in a mismatch between what the participant intended to convey in the meeting and the expression exhibited on the participant's avatar, which could be awkward, confusing, or insulting to other meeting participants.

Various embodiments include methods and computing devices configured to perform the methods for presenting a facial expression on a participant's avatar in a virtual meeting that include filtering out or avoiding rendering of expressions on the participant's avatar that the participant does not want displayed. In various embodiments, a computing device may detect a user facial expression or emotions based on information received from one or more sensors (e.g., a camera) of the computing device. The computing device may determine whether the detected user facial expression is approved for presentation on the participant's avatar in a virtual meeting. In response to determining that the detected user facial expression is approved for presentation on an avatar in the virtual meeting, the computing device may generate an avatar exhibiting a facial expression consistent with the detected user facial expression. In response to determining that the detected user facial expression is not approved for presentation on an avatar in the virtual meeting, the computing device may avoid rendering a facial expression on the participant's avatar consistent with the detected user facial expression, such as by generating an avatar exhibiting a facial expression that is approved for presentation and/or not changing the expression currently exhibited on the participant's avatar. In some embodiments, in response to determining that the detected user facial expression is not approved for presentation on an avatar in the virtual meeting, the computing device may generate an avatar exhibiting a recent, or most recent, expression that was approved presentation. In some embodiments, the computing device may generate an avatar exhibiting an expression consistent with the recent or most recent expression that was approved for presentation. The computing device may present the avatar with the generated representation of the user facial expression in the virtual meeting. In various embodiments, the facial expression presented on the avatar may include an expression affirmatively conveying a meaning or an emotion (e.g., joy, sadness, surprise, anger, contempt, disgust, fear, etc.), an expressive action (e.g., laughing, sighing, winking, smiling, gasping, etc.), a neutral expression, a "resting" face, or "no" expression.

In some embodiments, the computing device may detect the user facial expression based on images and/or information received from an image sensor of the computing device. In some embodiments, the computing device may process images (which may be single images or video) of the user's face to detect a facial expression. In some embodiments, the computing device may include a multi-modal sensor or group of sensors that include an image sensor to capture images or video of the user's face. In various embodiments, the system does not use or require additional devices, such as VR devices.

In some embodiments, the computing device also may store and process speech and/or other meaningful sounds and determines words, phrases, and sounds that accompany or correspond to certain facial expressions. In some embodiments, the computing device may capture the user's speech and other expressive sounds (sighs, laughter, etc.) with a microphone or another suitable audio sensor. In some embodiments, the computing device may detect the user facial expression based on an expressive sound of the user, for example, received via a microphone of the computing device. The term "expressive sound" is used herein to refer collectively to words and phrases (i.e., language) and meaningful sounds. Examples of a meaningful sound include a laugh, a sigh, a hum, a cough, a hesitation noise (e.g., "uh," "um," "er," "mm," etc.), a gasp, or another sound that conveys meaning to another person. In some embodiments, the computing device may correlate or associate the virtual facial expression with the user's expressive sounds. In some embodiments, the computing device may learn words, phrases, and/or sounds that are associated or correlated with various of the user's facial expressions.

In some embodiments, the computing device may determine automatically whether the generated virtual facial expression should be rendered on the user's avatar presented in the virtual meeting. In some embodiments, the system may compare the generated virtual facial expression to a database, list, or other suitable data structure of permitted or acceptable expressions (e.g., smile, laugh, studious, etc.)

and/or a database of unacceptable expressions (e.g., anger, frown, disgust, etc.), and if the generated virtual facial expression is on the permitted or acceptable expressions list, the computing device may render the expression on the user's avatar. The list of permitted or acceptable expressions and/or a list of unacceptable expressions may be preconfigured in the computing device, such as in a default list or a preset list provided by a manufacturer or a user selected or generated list established during a setup procedure (e.g., of software related to the virtual meeting).

In some embodiments, the computing device may learn and/or adjust the database, list, or other suitable data structure of permitted or acceptable expressions and/or list of expressions that are not permitted or are unacceptable through user interaction. For example, the computing device may determine that the detected facial expression is neither approved nor not approved for presentation (for example, in a preset list, or in a database or list of previously approved or rejected facial expressions). In response to determining that the detected user facial expression is neither approved nor not approved for presentation, in other words there has been no decision made on acceptability of the detected facial expression, the computing device may present on a user interface of the computing device an avatar exhibiting an expression consistent with the detected user facial expression in a user interface configured to receive a user input of approval or disapproval. In some embodiments, the computing device may render on a user interface of the computing device an avatar exhibiting a facial expression consistent with the detected user facial expression, with an invitation or prompt requesting that the user indicate whether the detected user facial expression is approved or not approved for presentation. In response to receiving an input on a user interface of the computing device indicating that the user facial expression is approved for presentation in the virtual meeting, the computing device may determine that the detected user facial expression is approved. In some embodiments, the computing device may store an indication that an avatar exhibiting the user facial expression is approved or is not approved, such as listing the facial expression for the avatar in a database or list of approved facial expressions or in a database or list of rejected facial expressions.

In some embodiments, the computing device may display the virtual facial expression in a user interface to enable the user make an input regarding whether the user approves or disapproves the displayed virtual facial expression, and may give the user a short period of time (e.g., 3-5 seconds) to respond to the user interface with a selection of approved or rejected. This preview opportunity may enable the user to filter or screen facial expressions before they are rendered on the user's avatar in the virtual meeting. To allow the user to approve or disapprove the displayed virtual facial expression without requiring an input every time facial expressions are posed on the user interface, the system may take a default action if the user does not respond within short period of time such as before expiration of a threshold time period. The default decision of approve or disapprove of a virtual facial expression presented in a user interface may be user defined (e.g., the user may enter a setting in a configuration interface to select whether ignoring the user interface prompt should be interpreted as approval or disapproval.

In some embodiments, the computing device may determine whether the generated virtual facial expression should be rendered on the user's avatar based on an expressive sound of the user. For example, an expressive sound of the user may be associated with an unacceptable expression, such as a snort of derision and a facial expression of contempt, or laughter and a facial expression of surprise or disbelief. In some embodiments, the computing device may determine whether the detected user facial expression is approved for presentation on the user's avatar based on the expressive sound of the user. For example, the computing device may determine that the user's expressive sound is associated with an unacceptable expression. In response, rather than the unapproved facial expression, the computing device may generate an avatar exhibiting a facial expression that is (or has previously been) approved for presentation.

In some embodiments, the computing device may be configured to learn over time (e.g., by a learning algorithm) user expressions that the user wants to display and expressions that the user does not want displayed (i.e., expressions that are accepted and not accepted). The computing device also may be configured to learn user expressions that are acceptable or appropriate to use when images of the user's face are ambiguous. The computing device also may be configured to learn expressive sounds that are associated with approved and disapproved expressions. In some embodiments, the computing device may be configured to determine whether the detected user facial expression was previously approved for presentation on an avatar in the virtual meeting (e.g., based on a database, list, etc.), and in response to determining that the detected user facial expression was previously approved for presentation on an avatar in the virtual meeting, the computing device may automatically generate an avatar exhibiting a facial expression consistent with the detected user facial expression. As noted above, the computing device may confirm and/or update a preset or default facial expression in response to receiving an input that is different from a preset or default facial expression. In this manner, the computing device may learn user facial expressions that are accepted and not accepted to update preset facial expressions or to update a database of acceptable and unacceptable facial expressions, and to add new facial expressions.

In this manner, the computing device may learn how to determine automatically whether to display a virtual facial expression without prompting the user for a response. Over time, such as in response to a number of consistent user decisions, the computing device may be configured to decrease a number or frequency of prompts that the computing device displays for approval or disapproval. Eventually, the computing device may stop prompting the user for expressions that are always accepted for display or never accepted for display, and immediately implement accepted expressions without bothering the user with prompts to approve or disapprove particular virtual avatar expressions.

Various embodiments improve the operation of computing devices and virtual meeting systems by filtering or preventing the generation of unacceptable virtual avatar expressions in virtual meetings. Various embodiments also improve the operation of computing devices and virtual meeting systems by learning various approved and disapproved facial expressions for presentation in a virtual meeting, and in this manner operating in an increasingly seamless fashion that requires less and less user prompting over time. Various embodiments also improve the operation of computing devices and virtual meeting systems by improving the speed and efficiency of their operation. Various embodiments further improve the operation of computing devices and virtual meeting systems by improving the speed and efficiency of their operability and user interactivity.

FIG. 1 is a system block diagram illustrating an example communications system 100. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as wireless devices 120a-120e in FIG. 1). The communications system 100 also may include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an evolved packet core (EPC) network), a 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported.

Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120*a*-120*e* may be included inside a housing that houses components of the wireless device 120*a*-120*e*, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more wireless devices (for example, illustrated as the wireless device 120*a* and the wireless device 120*e*) may communicate directly using one or more sidelink channels (for example, without using a base station 110*a*-110*d* as an intermediary to communicate with one another). For example, the wireless devices 120*a*-120*e* may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120*a*-120*e* may perform scheduling operations, resource selection operations, as well as other operations described elsewhere herein as being performed by the base station 110*a*-110*d*.

Figure 2:
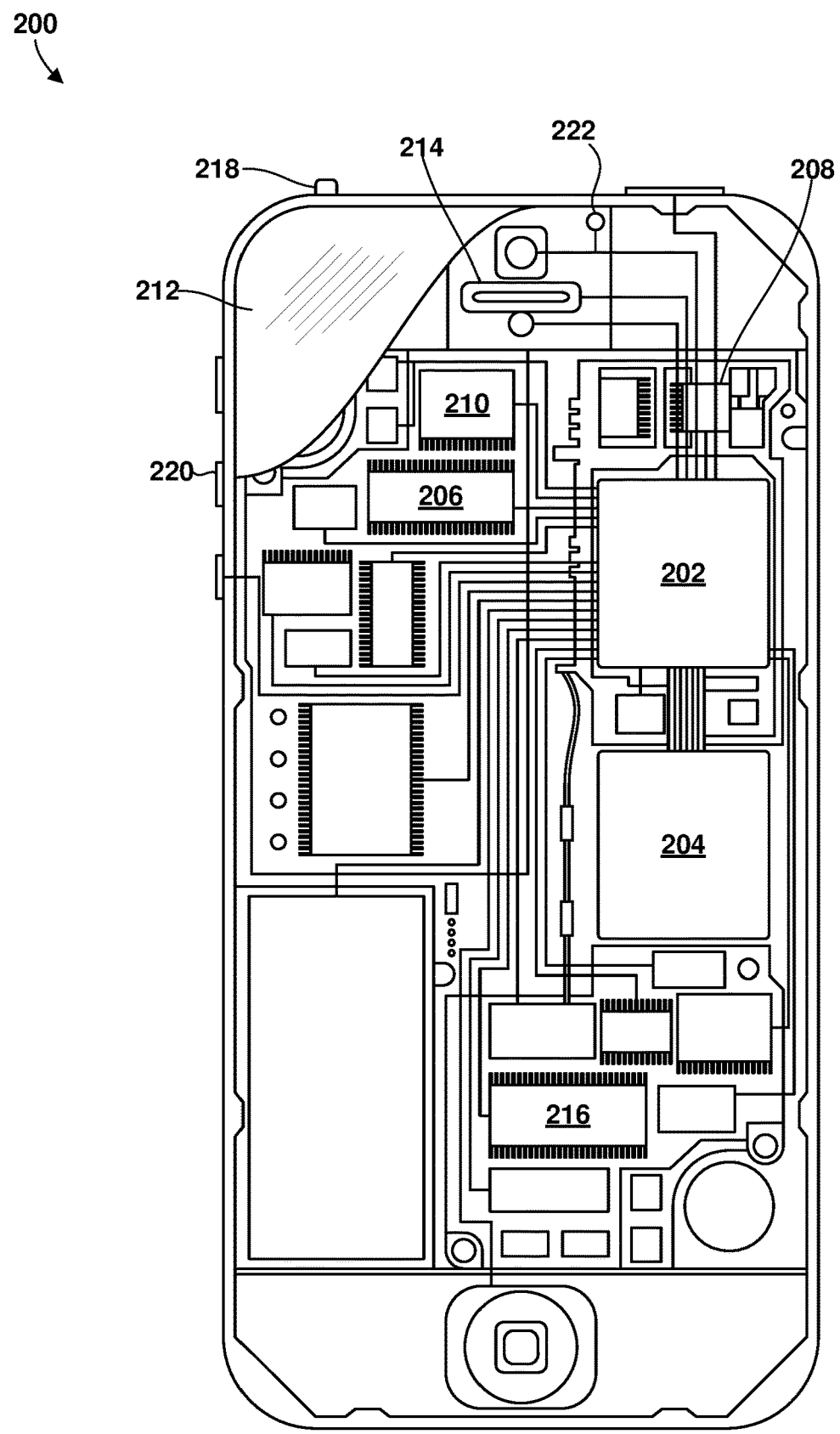
FIG. 2 is a component block diagram of an example computing device suitable for implementing any of the various embodiments.

FIG. 2 is a component block diagram of an example computing device 200 suitable for implementing any of the various embodiments. With reference to FIGS. 1 and 2, the computing device 200 may include a first System-On-Chip (SOC) processor 202 (such as a SOC-CPU) coupled to a second SOC 204 (such as a 5G capable SOC). The first and second SOCs 202, 204 may be coupled to internal memory 206, 216, a display 212, and to a speaker 214. Additionally, the computing device 200 may include an antenna 218 for sending and receiving electromagnetic radiation that may be connected to a wireless data link and/or wireless transceiver 208 coupled to one or more processors in the first and/or second SOCs 202, 204. The one or more processors may be configured to determine signal strength levels of signals received by the antenna 218. The computing device 200 may also include menu selection buttons or rocker switches 220 for receiving user inputs. In addition, soft virtual buttons may be presented on display 212 for receiving user inputs.

The computing device 200 may also include a sound encoding/decoding (CODEC) circuit 210, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 208 and CODEC 210 may include a digital signal processor (DSP) circuit (not shown separately). The computing device 200 may also include one or more optical sensors 222, such as a camera. The optical sensors 222 may be coupled to one or more processors in the first and/or second SOCs 202, 204 to control operation of and to receive information from the optical sensor(s) 222 (e.g., images, video, and the like).

The processors (e.g., SOCs 202, 204) of the computing device 200 may be any programmable microprocessor, microcomputer or multiple processor chip or chips that can be configured by software instructions (applications) to perform a variety of functions, including the functions of the various embodiments described below. In some wireless devices, multiple processors may be provided, such as one processor within an SOC 204 dedicated to wireless communication functions and one processor within an SOC 202 dedicated to running other applications. Typically, software applications including processor-executable instructions may be stored in non-transitory processor-readable storage media, such as the memory 206, 216, before the processor-executable instructions are accessed and loaded into the processor. The processors 202, 204 may include internal memory sufficient to store the application software instructions. The mobile device 102a-102e may also include optical sensors such as a camera (not shown).

Figure 3:
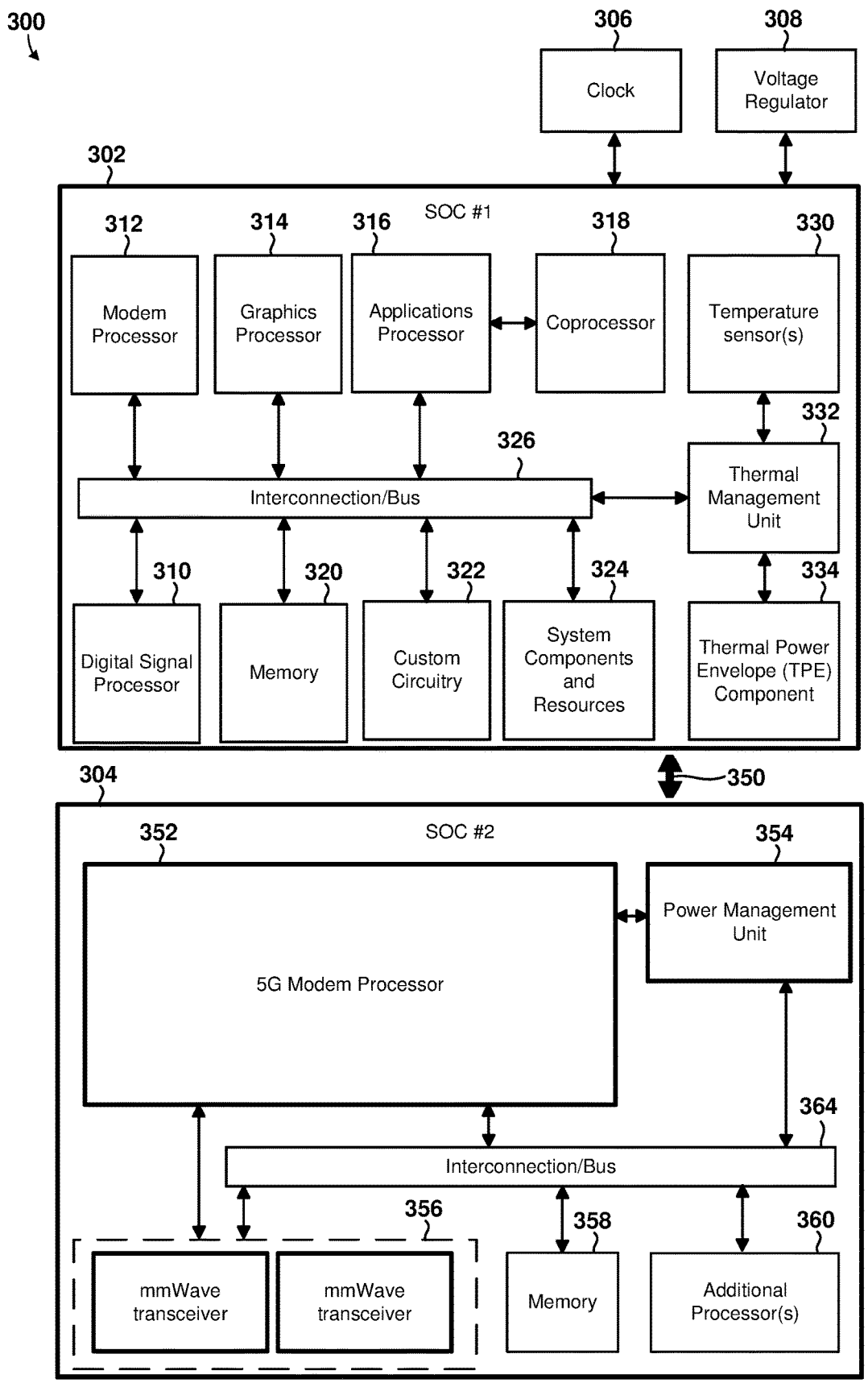
FIG. 3 is a component block diagram illustrating an example computing system architecture suitable for implementing any of the various embodiments.

FIG. 3 is a component block diagram illustrating an example computing system 300 architecture suitable for implementing any of the various embodiments. With reference to FIGS. 1-3, various embodiments may be implemented on a number of single processor and multiprocessor computer systems, including a system-on-chip (SOC) or system in a package (SIP). The computing system 300 may include a two SOCs 302, 304, a clock 306, and a voltage regulator 308. In some embodiments, the first SOC 302 operate as central processing unit (CPU) of the wireless device that carries out the instructions of software application programs by performing the arithmetic, logical, control and input/output (I/O) operations specified by the instructions. In some embodiments, the second SOC 304 may operate as a specialized processing unit. For example, the second SOC 304 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 302 may include a digital signal processor (DSP) 310, a modem processor 312, a graphics processor 314, an application processor 316, one or more coprocessors 318 (e.g., vector co-processor) connected to one or more of the processors, memory 320, custom circuitry 322, system components and resources 324, an interconnection/bus module 326, one or more temperature sensors 330, a thermal management unit 332, and a thermal power envelope (TPE) component 334. The second SOC 304 may include a 5G modem processor 352, a power management unit 354, an interconnection/bus module 364, a plurality of mmWave transceivers 356, memory 358, and various additional processors 360, such as an applications processor, packet processor, etc.

Each processor 310, 312, 314, 316, 318, 352, 360 may include one or more cores, and each processor/core may perform operations independent of the other processors/cores. For example, the first SOC 302 may include a processor that executes a first type of operating system (e.g., FreeBSD, LINUX, OS X, etc.) and a processor that executes a second type of operating system (e.g., MICROSOFT WINDOWS 10). In addition, any or all of the processors 310, 312, 314, 316, 318, 352, 360 may be included as part of a processor cluster architecture (e.g., a synchronous processor cluster architecture, an asynchronous or heterogeneous processor cluster architecture, etc.).

The first and second SOC 302, 304 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 324 of the first SOC 302 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 324 and/or custom circuitry 322 may also include circuitry to interface with peripheral devices, such as cameras, electronic displays, wireless communication devices, external memory chips, etc.

The first and second SOC 302, 304 may communicate via interconnection/bus module 350. The various processors 310, 312, 314, 316, 318, may be interconnected to one or more memory elements 320, system components and resources 324, and custom circuitry 322, and a thermal management unit 332 via an interconnection/bus module 326. Similarly, the processor 352 may be interconnected to the power management unit 354, the mmWave transceivers 356, memory 358, and various additional processors 360 via the interconnection/bus module 364. The interconnection/bus module 326, 350, 364 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 302, 304 may further include an input/output module (not illustrated) for communicating with resources external to the SOC, such as a clock 306 and a voltage regulator 308. Resources external to the SOC (e.g., clock 306, voltage regulator 308) may be shared by two or more of the internal SOC processors/cores.

In addition to the example computing system 300 discussed above, various embodiments may be implemented in a wide variety of computing systems, which may include a single processor, multiple processors, multicore processors, or any combination thereof.

Figure 4:
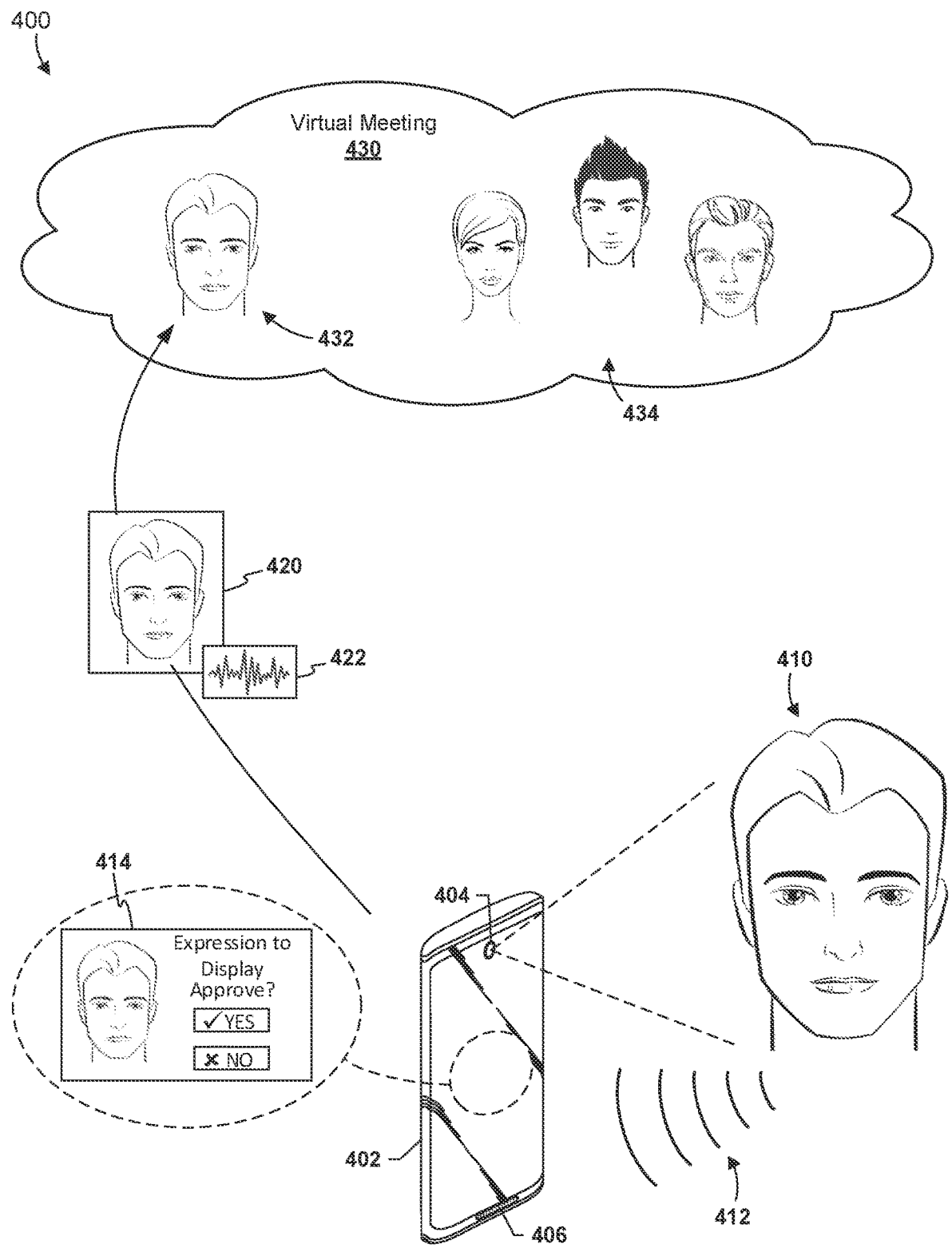
FIG. 4 is a conceptual diagram illustrating aspects of a method for presenting a facial expression in a virtual meeting in accordance with various embodiments.

FIG. 4 is a conceptual diagram illustrating aspects of a method 400 for presenting a facial expression in a virtual meeting in accordance with various embodiments. With reference to FIGS. 1-4, a computing device 402 may be configured to participate in a virtual meeting 430 via a communications network or communications system (aspects of which are discussed above with respect to the communications system 100). In some embodiments, virtual meeting 430 may include one or more avatars 432, 434 of various users, each of whom may participate via a computing device such as the computing device 402.

The computing device 402 may include one or more image sensors such as a camera 404, and one or more sound sensors such as a microphone 406. The camera 404 may be directed to capture an image, such as an image of a user's face 410. The microphone 406 may capture one or more expressive sounds 412 of the user.

The computing device 402 may be configured to detect a user's facial expression based on the information received from a sensor of the computing device 402, such as the camera 404 and or the microphone 406. The computing device 402 may be further configured to generate a representation of the user's facial expression 420. In some embodiments, the representation of the user's facial expression 420 may include an image or images that may be presented on or incorporated into the user's avatar 432 in the virtual meeting 430. In some embodiments, the representation of the user's facial expression 420 may include one or more instructions that a device hosting or executing the virtual meeting 430 may process to present the user's facial expression on an avatar in the virtual meeting. 430. The representation of the user's facial expression 420 may be presented on an avatar within the virtual meeting 430 in a manner that is perceptible to other participants (e.g., associated with the avatars 434) in the virtual meeting 430.

The computing device 402 also may be configured to generate a representation of the expressive sound 422. In various embodiments, the representation of the expressive sound 422 may be a sound file, a digital bit stream, or another suitable representation. In some embodiments, the representation of the expressive sound 422 may be presented in the virtual meeting 430 in conjunction with the representation of the user's facial expression 420.

As further described below, the computing device 402 may be configured to determine whether the user is detected facial expression is approved or not approved for presentation in the virtual meeting 430. In some embodiments, the computing device 402 may be configured to present the detected user facial expression for approval by the user. For example, the computing device 402 may be configured to generate a prompt 414 that the computing device 402 may display on an avatar, for example, on a display device such as a screen. The prompt may include one or more user interface elements enabling the user to provide an input approving or disapproving/rejecting a facial expression for presentation on an avatar in the virtual meeting 430. The computing device 402 may store an indication that the user facial expression is approved or is not approved for rendering on an avatar in response to receiving an input approving or disapproving the user facial expression for presentation. In some embodiments, if the detected facial expression is preset as approved or not approved for presentation on an avatar, the computing device may update the preset in response to the user input that is different from the preset. In this manner, the computing device 402 may learn and/or adjust a list of permitted or acceptable expressions and/or a list of unacceptable expressions through user interactions.

Further, the computing device 402 may learn to determine automatically whether to display a virtual facial expression without prompting the user for a response. In some embodiments, the detected expression may be one that the user has previously approved or disapproved for presentation on the avatar 432 in the virtual meeting 430. In such embodiments, the computing device 402 may bypass or not present to the prompt 414, and may proceed to send the representation of the approved user facial expression 420 for presentation on the avatar 432 in the virtual meeting 430. In some embodiments, the computing device 402 may determine that the detected facial expression was previously not approved or was previously rejected by the user. In such embodiments, the computing device 402 may generate a representation of a facial expression that is approved, or that has been approved, for presentation on the avatar 432 in the virtual meeting 430.

Figure 5:
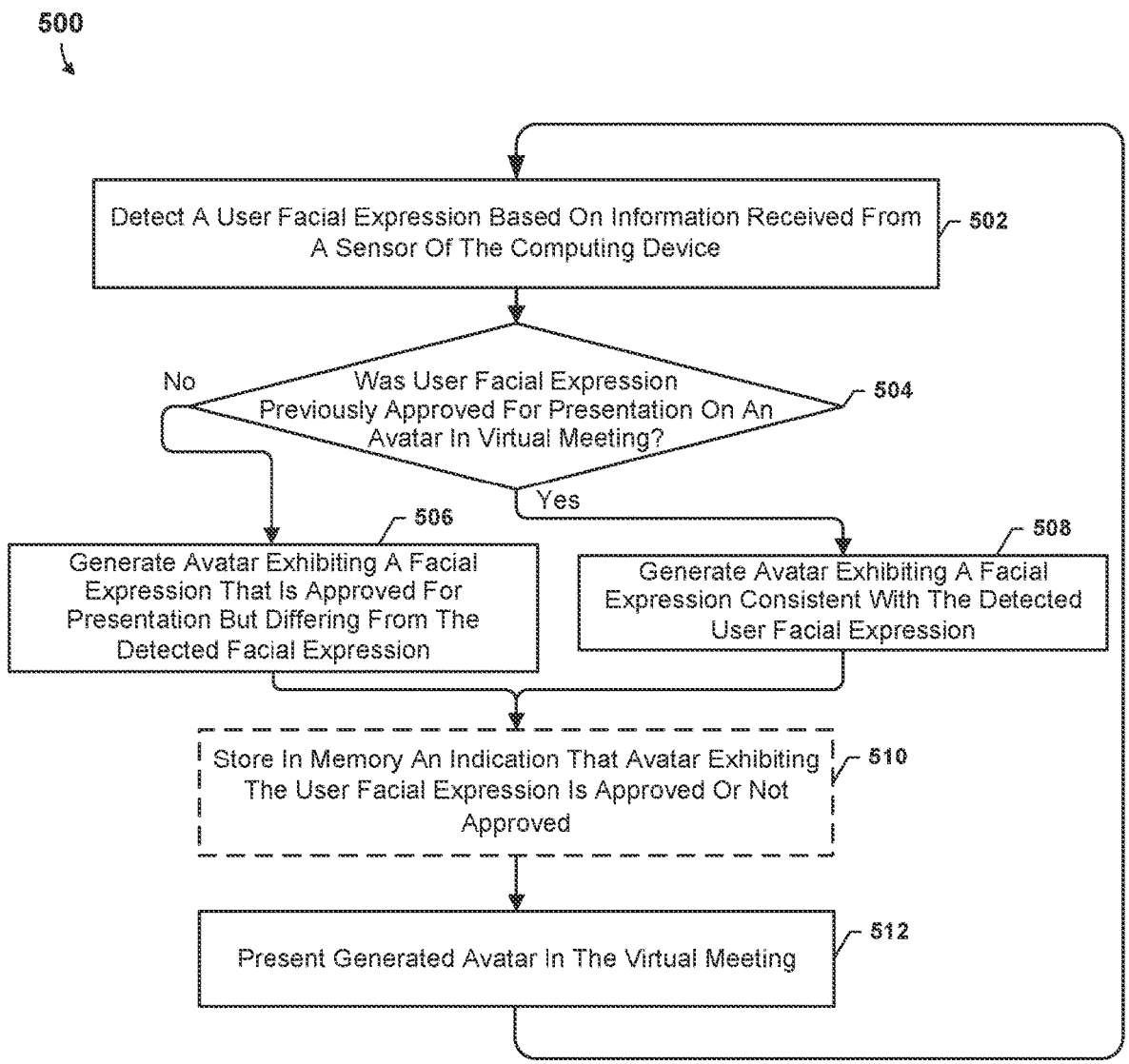
FIG. 5 is a process flow diagram illustrating a method for presenting a facial expression in a virtual meeting in accordance with various embodiments.

FIG. 5 is a process flow diagram illustrating a method 500 for presenting a facial expression in a virtual meeting in accordance with various embodiments. With reference to FIGS. 1-5, the method 500 may be implemented by a processor (e.g., 202, 204, 310-318, 352, 360) of a computing device (e.g., 120a-120e, 200, 404).

In block 502, the processor may detect a user facial expression based on information received from a sensor of the computing device. In some embodiments, the processor may detect the user facial expression based on information received from a camera (e.g., the camera 404) of the computing device. In some embodiments, the processor may detect the user facial expression based on information received from a microphone (e.g., the microphone 406) of the computing device. In some embodiments, the processor may detect an expressive sound of the user, and may use the expressive sound in detecting the user facial expression.

In determination block 504, the processor may determining whether the detected user facial expression is approved for presentation on an avatar in a virtual meeting. In some embodiments, the processor may determine whether the detected user facial expression was previously approved for presentation on an avatar in the virtual meeting. In some embodiments, the processor may determine whether the detected user facial expression is included in a list of pre-approved or pre-disapproved facial expressions, such as a default or preset list. In some embodiments, the processor may determining whether the detected user facial expression is approved for presentation on the avatar in the virtual meeting based on an expressive sound of the user. In some embodiments, the expressive sound may be correlated with or associated with a facial expression.

In response to determining that the detected user facial expression is not approved for presentation on an avatar in a virtual meeting (i.e., determination block 504="No"), the processor may generate an avatar exhibiting a facial expression that is approved for presentation but differing from the detected user facial expression in block 506. In some embodiments, the processor may generate an avatar exhibiting a recent expression that was approved for presentation on the user's meeting avatar. In some embodiments, the processor may generate an avatar exhibiting the most recently-approved user facial expression. In some embodiments, the processor may generate an avatar exhibiting the most recently-approved user facial expression that is consistent with or closest to the detected user facial expression. In some embodiments, the processor may maintain the facial expression that was rendered on the avatar prior to detecting the user facial expression, in other words continuing to present the currently-presented avatar.

In response to determining that the detected user facial expression is approved for presentation on an avatar in a virtual meeting (i.e., determination block 504="Yes"), the processor may generate an avatar exhibiting a facial expression consistent with the detected user facial expression.

Following performance of the operations of blocks 506 or 508, the processor may store in a memory an indication that an avatar exhibiting the user facial expression is approved or is not approved in response to receiving an input on a user interface of the computing device indicating that the user facial expression is approved or is not approved for presentation in the virtual meeting in optional block 510.

In block 512, the processor may present the avatar with the generated representation of the user facial expression in the virtual meeting in block. For example, the processor may send the representation of the user's facial expression 420 for rendering on the user's avatar 432 in the virtual meeting 430.

In optional block 514, the processor may render a representation of an expressive sound of the user in the virtual meeting in conjunction with presenting the generated avatar in the virtual meeting (i.e., presenting the generated avatar with a representation of the user's facial expression). For example, the processor may render a representation of the expressive sound 422 in the virtual meeting (e.g., 430) in conjunction with presenting the generated avatar.

The processor may perform the method 500 periodically or continuously by again detecting the user's next facial expression in block 502 and performing the operations of blocks 504-512 as described throughout a virtual meeting.

Figure 6A:
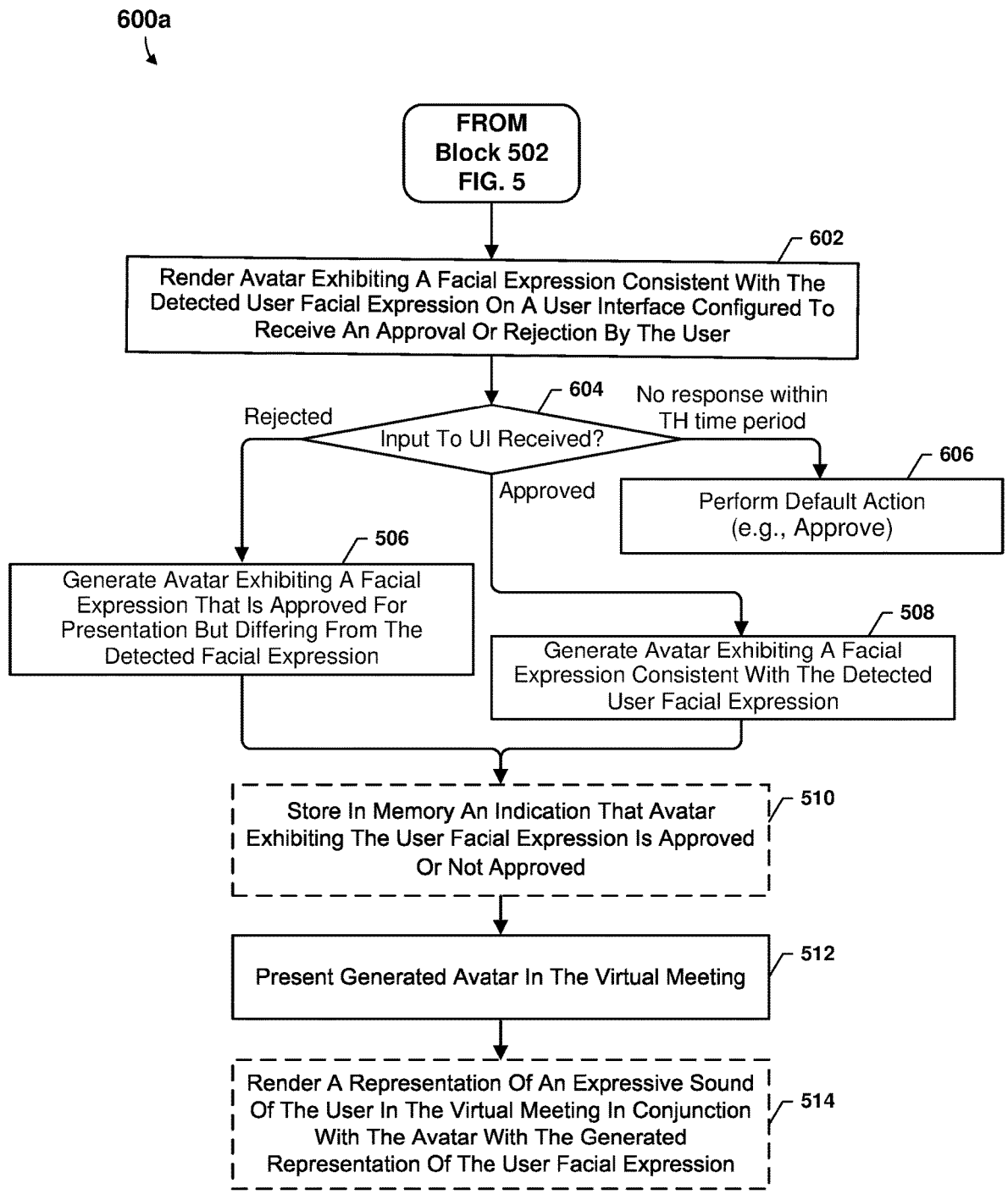
FIGS. 6A and 6B illustrate operations that may be performed as part of the method for presenting a facial expression a virtual meeting in accordance with various embodiments.
Figure 6B:
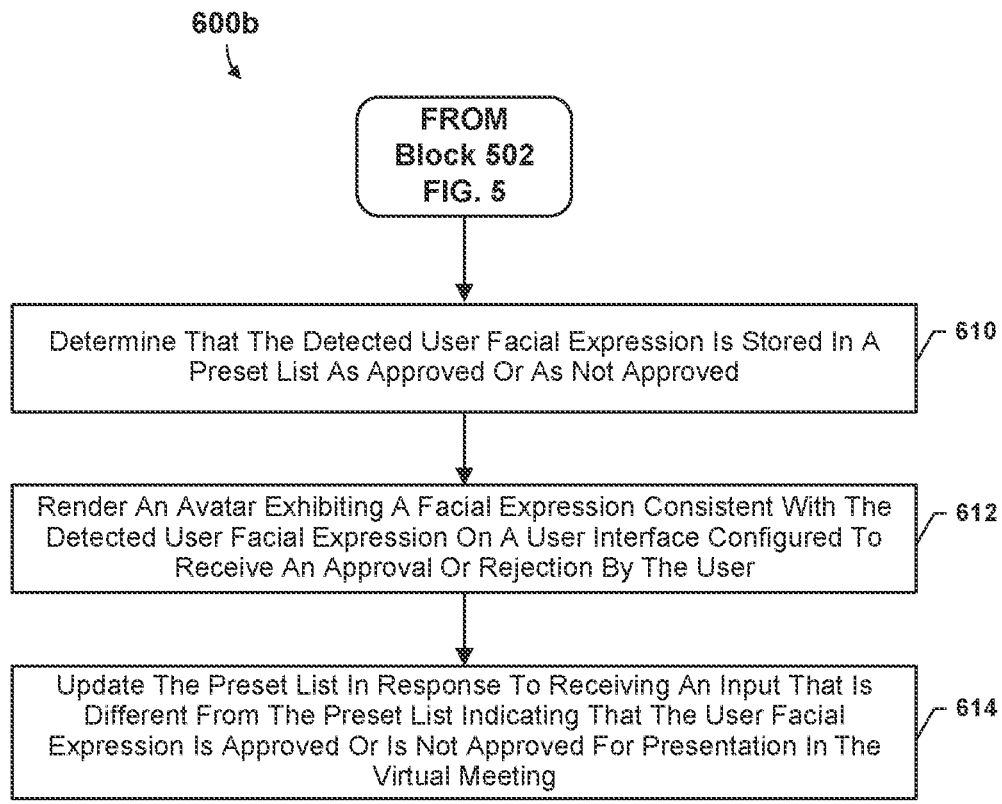

FIGS. 6A and 6B illustrate operations 600a and 600b that may be performed as part of the method 500 for presenting a facial expression a virtual meeting in accordance with various embodiments. With reference to FIGS. 1-6B, the operations 600a and 600b may be implemented by a processor (e.g., 202, 204, 310-318, 352, 360) of a computing device (e.g., 120a-120e, 200, 404).

Referring to FIG. 6A, following performance of the operations of block 502 (FIG. 5), the processor may render an avatar exhibiting a facial expression consistent with the detected user facial expression on a user interface configured to receive an approval or rejection by the user in block 602. For example, the processor may generate a prompt (e.g., 414) configured to receive an input to a user interface element approving or disapproving of the presented avatar facial expression.

In determination block 602, the processor may determine whether an input is received in response to the user interface approving or rejecting the presented avatar facial expression.

In response to receiving an input rejecting presented avatar facial expression (i.e., determination block 604="Rejected"), the processor may perform the operations of block 506 of the method 500 as described.

In response to receiving an input approving the facial expression (i.e., determination block 604="Approved"), the processor may perform the operations of block 508 of the method 500 as described.

In the absence of a responsive input to the user interface within a threshold (TH) period of time (i.e., determination block 604="No response within TH time period"), the processor may perform a default action in block 606. In some embodiments, the processor may determine that the presented avatar facial expression is approved for use in the virtual meeting in the absence of a responsive input to the user interface within the threshold period of time, and perform the operations in block 508 as described. In some embodiments, the processor may determine that the presented avatar facial expression is not approved for use in the virtual meeting in the absence of a responsive input to the user interface within a threshold period of time, and perform the operations in block 506 as described.

Referring to FIG. 6B, following performance of the operations of block 502 of the method 500, in some embodiments, based on a user's input approving or rejecting/disapproving a facial expression for presentation on the user's avatar in the virtual meeting, the processor may update a preset list based on the user's input.

For example, in block 610, the processor may determine that the presented avatar facial expression is stored in a preset list as approved or as not approved.

In block 612, the processor may render an avatar exhibiting a facial expression consistent with the detected user facial expression on a user interface configured to receive an approval or rejection by the user. For example, the processor may present on a display the prompt 414.

In block 614, the processor may update the preset list of approved or disapproved avatar expressions in response to receiving an input that is different from the preset list indicating that the user facial expression is approved or is not approved for presentation in the virtual meeting.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations methods 500, 600a, and 600b may be substituted for or combined with one or more operations of the methods 500, 600a, and 600b.

Implementation examples are described in the following paragraphs. While some of the following implementation examples are described in terms of example methods, further example implementations may include: the example methods discussed in the following paragraphs implemented by a computing device including a processor configured with processor-executable instructions to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1. A method performed by a processor of a computing device for presenting a facial expression on an avatar in a virtual meeting, including detecting a user facial expression of a user based on information received from a sensor of the computing device; determining whether the detected user facial expression is approved for presentation on an avatar in a virtual meeting; generating an avatar exhibiting a facial expression consistent with the detected user facial expression in response to determining that the detected user facial expression is approved for presentation on an avatar in the virtual meeting; and presenting the generated avatar in the virtual meeting.

Example 2. The method of example 1, further including continuing to present a currently-presented avatar in response to determining that the detected user facial expression is not approved for presentation on an avatar in the virtual meeting.

Example 3. The method of example 1, further including generating an avatar exhibiting a facial expression that is approved for presentation on an avatar in a virtual meeting but differing from the detected user facial expression in response to determining that the detected user facial expression is not approved for presentation on an avatar in the virtual meeting.

Example 4. The method of any of examples 1-3, in which generating an avatar exhibiting a facial expression that is approved for presentation on an avatar in a virtual meeting but differing from the detected user facial expression in response to determining that the detected user facial expression is not approved for presentation on an avatar in the virtual meeting includes generating an avatar exhibiting a recent expression that was approved for presentation.

Example 5. The method of any of examples 1-4, in which detecting a user facial expression based on information received from a sensor of the computing device includes detecting the user facial expression based on information received from an image sensor of the computing device.

Example 6. The method of any of examples 1-5, in which determining whether the detected user facial expression is approved for presentation on an avatar in a virtual meeting includes determining whether the user facial expression was previously approved for presentation on an avatar in the virtual meeting; and presenting the generated avatar in the virtual meeting includes presenting in the virtual meeting the generated avatar exhibiting the facial expression that was previously approved in response to determining that the user facial expression was previously approved for presentation on the avatar in the virtual meeting.

Example 7. The method of any of examples 1-6, in which determining whether the detected user facial expression is approved for presentation on an avatar in a virtual meeting includes rendering an avatar exhibiting a facial expression consistent with the detected user facial expression on a user interface configured to receive an approval or rejection by the user; and determining that the detected user facial expression is approved in response to receiving an input on a user interface of the computing device indicating that the user facial expression is approved for presentation in the virtual meeting.

Example 8. The method of example 7, further including, in the absence of a responsive input to the user interface within a threshold period of time, determining that the detected user facial expression is approved for presentation on an avatar in the virtual meeting.

Example 9. The method of any of examples 1-8, further including storing in a memory an indication that an avatar exhibiting a facial expression consistent with the detected the user facial expression is approved or is not approved for presentation in a virtual meeting in response to receiving an input on a user interface of the computing device indicating that the detected user facial expression is approved or is not approved for presentation on an avatar in the virtual meeting.

Example 10. The method of any of examples 1-9, in which determining whether the detected user facial expression is approved for presentation on an avatar in a virtual meeting includes determining that the detected user facial expression is stored in a preset list as approved or as not approved, rendering an avatar exhibiting a facial expression consistent with the detected user facial expression on a user interface configured to receive an approval or rejection by the user, and updating the preset list in response to receiving an input that is different from the preset list indicating that the user facial expression is approved or is not approved for presentation on an avatar in the virtual meeting.

Example 11. The method of any of examples 1-10, in which determining whether the detected user facial expression is approved for presentation on an avatar in a virtual meeting includes determining whether the detected user facial expression is approved for presentation on the avatar in the virtual meeting based on an expressive sound of the user.

Example 12. The method of any of examples 1-11, in which presenting the generated avatar in the virtual meeting includes rendering a representation of an expressive sound of the user in the virtual meeting in conjunction with presenting the generated avatar in the virtual meeting.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a computing device for presenting a facial expression on an avatar in a virtual meeting, comprising:
    detecting a user facial expression of a user based on information received from a sensor of the computing device;
    determining whether the detected user facial expression was previously approved for presentation on an avatar in a virtual meeting;
    generating an avatar exhibiting a facial expression that is approved for presentation on an avatar in a virtual meeting but differing from the detected user facial expression in response to determining that the detected user facial expression was previously not approved for presentation on an avatar in the virtual meeting;
    generating an avatar exhibiting a facial expression consistent with the detected user facial expression in response to determining that the detected user facial expression was previously approved for presentation on an avatar in the virtual meeting; and
    presenting the generated avatar in the virtual meeting.

2. The method of claim 1, wherein generating the avatar exhibiting a facial expression that is approved for presentation on an avatar in a virtual meeting but differing from the detected user facial expression in response to determining that the detected user facial expression is not approved for presentation on an avatar in the virtual meeting comprises continuing to present a currently-presented avatar.

3. The method of claim 1, wherein generating an avatar exhibiting a facial expression that is approved for presentation on an avatar in a virtual meeting but differing from the detected user facial expression in response to determining that the detected user facial expression is not approved for presentation on an avatar in the virtual meeting comprises generating an avatar exhibiting a recent expression that was approved for presentation.

4. The method of claim 1, wherein detecting a user facial expression based on information received from a sensor of the computing device comprises detecting the user facial expression based on information received from an image sensor of the computing device.

5. The method of claim 1, further comprising determining whether the detected user facial expression is approved for presentation on an avatar in a virtual meeting, including:
    rendering an avatar exhibiting a facial expression consistent with the detected user facial expression on a user interface configured to receive an approval or rejection by the user; and
    determining that the detected user facial expression is approved in response to receiving an input on a user interface of the computing device indicating that the user facial expression is approved for presentation in the virtual meeting.

6. The method of claim 5, further comprising:
    in the absence of a responsive input to the user interface within a threshold period of time, determining that the detected user facial expression is approved for presentation on an avatar in the virtual meeting.

7. The method of claim 1, further comprising:
    storing in a memory an indication that an avatar exhibiting a facial expression consistent with the detected the user facial expression is approved or is not approved for presentation in a virtual meeting in response to receiving an input on a user interface of the computing device indicating that the detected user facial expression is approved or is not approved for presentation on an avatar in the virtual meeting.

8. The method of claim 1, wherein determining whether the detected user facial expression was previously approved for presentation on an avatar in a virtual meeting comprises:
    determining that the detected user facial expression is stored in a preset list as approved or as not approved;
    rendering an avatar exhibiting a facial expression consistent with the detected user facial expression on a user interface configured to receive an approval or rejection by the user; and
    updating the preset list in response to receiving an input that is different from the preset list indicating that the user facial expression is approved or is not approved for presentation on an avatar in the virtual meeting.

9. The method of claim 1, further comprising determining whether the detected user facial expression is approved for presentation on an avatar in a virtual meeting comprises determining whether the detected user facial expression is approved for presentation on the avatar in the virtual meeting based on an expressive sound of the user.

10. The method of claim 1, wherein presenting the generated avatar in the virtual meeting comprises rendering a representation of an expressive sound of the user in the virtual meeting in conjunction with presenting the generated avatar in the virtual meeting.

11. A computing device, comprising:
    a sensor configured to detect facial expressions of a user of the computing device; and
    a processor coupled to the sensor and configured with processor-executable instructions to:
        detect a user facial expression based on information received from the sensor;
        determine whether the detected user facial expression was previously approved for presentation on an avatar in a virtual meeting;
        generate an avatar exhibiting a facial expression that is approved for presentation on an avatar in a virtual meeting but differing from the detected user facial expression in response to determining that the detected user facial expression was previously not approved for presentation on an avatar in the virtual meeting;
        generate an avatar exhibiting a facial expression consistent with the detected user facial expression in response to determining that the detected user facial expression was previously approved for presentation on an avatar in the virtual meeting; and
        present the generated avatar in the virtual meeting.

12. The computing device of claim 11, wherein the processor is further configured with processor-executable instructions to generate an avatar exhibiting a facial expression that is approved for presentation on an avatar in a virtual meeting but differing from the detected user facial expression in response to determining that the detected user facial expression is not approved for presentation on an avatar in the virtual meeting by continuing to present a currently-presented avatar.

13. The computing device of claim 11, wherein the processor is further configured with processor-executable instructions to generate an avatar exhibiting a recent expression that was approved for presentation.

14. The computing device of claim 11, wherein the sensor is an image sensor.

15. The computing device of claim 11, wherein the processor is further configured with processor-executable instructions to:
  render an avatar exhibiting a facial expression consistent with the detected user facial expression on a user interface configured to receive an approval or rejection by the user; and
  determine that the detected user facial expression is approved in response to receiving an input on a user interface of the computing device indicating that the user facial expression is approved for presentation in the virtual meeting.

16. The computing device of claim 15, wherein the processor is further configured with processor-executable instructions to:
  determine that the detected user facial expression is approved for presentation on an avatar in the virtual meeting in the absence of a responsive input to the user interface within a threshold period of time.

17. The computing device of claim 11, wherein the processor is further configured with processor-executable instructions to:
  store in a memory an indication that an avatar exhibiting a facial expression consistent with the detected the user facial expression is approved or is not approved for presentation in a virtual meeting in response to receiving an input on a user interface of the computing device indicating that the detected user facial expression is approved or is not approved for presentation on an avatar in the virtual meeting.

18. The computing device of claim 11, wherein the processor is further configured with processor-executable instructions to:
  determine that the detected user facial expression is stored in a preset list as approved or as not approved;
  render an avatar exhibiting a facial expression consistent with the detected user facial expression on a user interface configured to receive an approval or rejection by the user; and
  update the preset list in response to receiving an input that is different from the preset list indicating that the user facial expression is approved or is not approved for presentation on an avatar in the virtual meeting.

19. The computing device of claim 11, further comprising a microphone coupled to the processor, wherein the processor is further configured with processor-executable instructions to determine whether the detected user facial expression is approved for presentation on the avatar in the virtual meeting based on an expressive sound of the user detected by the microphone.

20. The computing device of claim 11, wherein the processor is further configured with processor-executable instructions to render a representation of an expressive sound of the user in the virtual meeting in conjunction with presenting the generated avatar in the virtual meeting.

21. A computing device, comprising:
  means for detecting a user facial expression of a user based on information received from a sensor of the computing device;
  means for determining whether the detected user facial expression was previously for presentation on an avatar in a virtual meeting;
  means for generating an avatar exhibiting a facial expression that is approved for presentation on an avatar in a virtual meeting but differing from the detected user facial expression in response to determining that the detected user facial expression was previously not approved for presentation on an avatar in the virtual meeting;
  means for generating an avatar exhibiting a facial expression consistent with the detected user facial expression in response to determining that the detected user facial expression was previously approved for presentation on an avatar in the virtual meeting; and
  means for presenting the generated avatar in the virtual meeting.

22. The computing device of claim 21 wherein means for generating an avatar exhibiting a facial expression that is approved for presentation on an avatar in a virtual meeting but differing from the detected user facial expression in response to determining that the detected user facial expression is not approved for presentation on an avatar in the virtual meeting comprises means for continuing to present a currently-presented avatar.

23. The computing device of claim 21, wherein means for generating an avatar exhibiting a facial expression that is approved for presentation on an avatar in a virtual meeting but differing from the detected user facial expression in response to determining that the detected user facial expression is not approved for presentation on an avatar in the virtual meeting comprises means for generating an avatar exhibiting a recent expression that was approved for presentation.

24. The computing device of claim 21, wherein means for detecting a user facial expression based on information received from a sensor of the computing device comprises means for detecting the user facial expression based on information received from an image sensor of the computing device.

25. The computing device of claim 21, further comprising means for determining whether the detected user facial expression is approved for presentation on an avatar in a virtual meeting, including:
  means for rendering an avatar exhibiting a facial expression consistent with the detected user facial expression on a user interface configured to receive an approval or rejection by the user; and
  means for determining that the detected user facial expression is approved in response to receiving an input on a user interface of the computing device indicating that the user facial expression is approved for presentation in the virtual meeting.

26. The computing device of claim 25, further comprising:
  means for determining that the detected user facial expression is approved for presentation on an avatar in the virtual meeting in the absence of a responsive input to the user interface within a threshold period of time.

27. The computing device of claim 21, further comprising:
  means for storing in a memory an indication that an avatar exhibiting a facial expression consistent with the detected the user facial expression is approved or is not approved for presentation in a virtual meeting in response to receiving an input on a user interface of the computing device indicating that the detected user facial expression is approved or is not approved for presentation on an avatar in the virtual meeting.

28. The computing device of claim 21, wherein means for determining whether the detected user facial expression was previously approved for presentation on an avatar in a virtual meeting comprises:
  means for determining that the detected user facial expression is stored in a preset list as approved or as not approved;
  means for rendering an avatar exhibiting a facial expression consistent with the detected user facial expression on a user interface configured to receive an approval or rejection by the user; and
  means for updating the preset list in response to receiving an input that is different from the preset list indicating that the user facial expression is approved or is not approved for presentation on an avatar in the virtual meeting.

29. The computing device of claim 21, further comprising means for determining whether the detected user facial expression is approved for presentation on an avatar in a virtual meeting comprises means for determining whether the detected user facial expression is approved for presentation on the avatar in the virtual meeting based on an expressive sound of the user.

30. The computing device of claim 21, wherein means for presenting the generated avatar in the virtual meeting comprises means for rendering a representation of an expressive sound of the user in the virtual meeting in conjunction with presenting the generated avatar in the virtual meeting.

31. A non-transitory processor-readable medium having stored thereon processor-executable instruction configured to cause a processor of a computing device in a computing device to perform operations comprising:
  detecting a facial expression of a user based on information received from a sensor of the computing device;
  determining whether the detected user facial expression was previously approved for presentation on an avatar in a virtual meeting;
  generating an avatar exhibiting a facial expression that is approved for presentation on an avatar in a virtual meeting but differing from the detected user facial expression in response to determining that the detected user facial expression was previously not approved for presentation on an avatar in the virtual meeting;
  generating an avatar exhibiting a facial expression consistent with the detected user facial expression in response to determining that the detected user facial expression was previously approved for presentation on an avatar in the virtual meeting;
  and
  presenting the generated avatar in the virtual meeting.

* * * * *